THERMOELECTRIC CONVERSION PROCESS AND APPARATUS

Filed Feb. 3, 1961

INVENTOR.
RALPH FORMAN
BY
ATTORNEY

United States Patent Office 3,198,968
Patented Aug. 3, 1965

3,198,968
THERMOELECTRIC CONVERSION PROCESS AND APPARATUS

Ralph Forman, Rocky River, Ohio, assignor to Union Carbide Corporation, a corporation of New York Filed Feb. 3, 1961, Ser. No. 86,881
6 Claims. (Cl. 310—4)

This invention relates generally to a process and apparatus for converting heat energy to electrical energy and, more particularly, to a process and apparatus for converting heat energy directly into electrical energy by thermal ionization from a hot body.

Heretofore, it has been proposed to convert heat energy to electrical energy by passing a gas having a very low ionization potential over a hot electron-emitting material which has a work function higher than the ionization potential of the gas. Such a process is employed in the cesium thermionic converter, wherein heat energy is converted directly into electrical energy by passing cesium gas, which has a very low ionization potential (3.8 ev.), over a hot tungsten filament, which has a work function (4.6 ev.) higher than the ionization potential of the cesium gas and thus ionizes the cesium gas. The general operating principle for the cesium thermionic converter is that the ionized cesium produced by the hot filament neutralizes the space charge which is ordinarily responsible for inhibiting thermionic emission from the hot filament. Although the operating principle of the cesium thermionic converter is a sound one, effective electron emitters usually have low work functions, and a relatively small number of gases have such low ionization potentials. Thus, relatively few gases are suitable for use in such devices. Also, gases having low ionization potentials are often chemically active and difficult to contain in a closed system, which makes construction of the device considerably more difficult.

It is, therefore, the main object of the present invention to provide a thermoelectric conversion process and apparatus wherein the gas ionized has an ionization potential greater than the thermionic work function of the cathode.

It is another object of the invention to provide a thermoelectric conversion process and apparatus wherein the space charge surrounding the cathode is neutralized by ionization of a gas having an ionization potential greater than the thermionic work function of the cathode.

It is a further object of the invention to provide a relatively efficient thermoelectric conversion process and apparatus which may have a high power output/weight ratio.

Another object of the invention is to provide an improved process and apparatus for varying space charge effects near a hot cathode so as to vary the electric current obtained therefrom.

A still further object of the invention is to provide a long-lived thermoelectric conversion apparatus.

Other aims and advantages of the invention will be apparent from the following description and appended claims.

Figures 1, 2, 3:
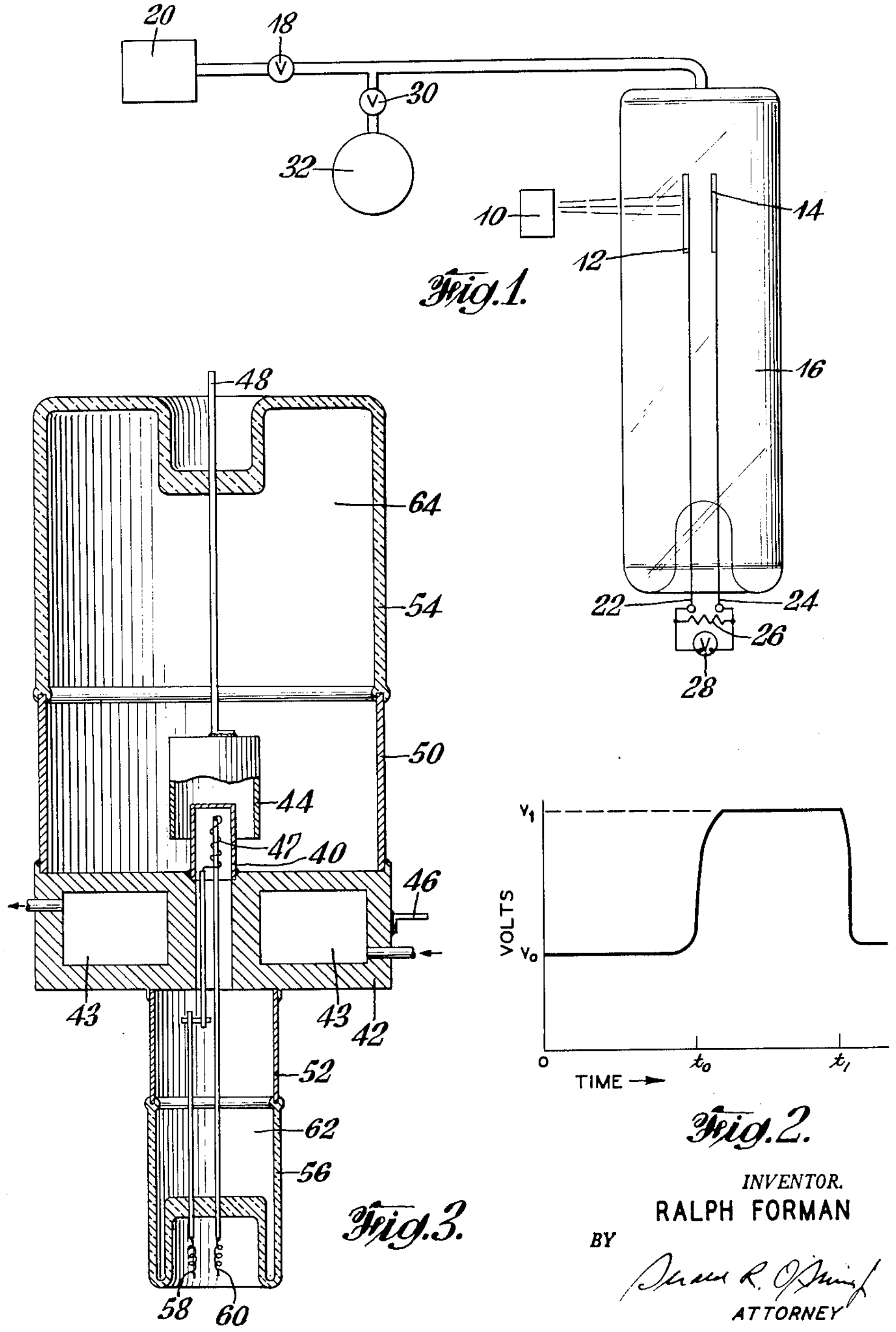
FIG. 1 is a schematic view of an experimental thermoelectric converter for carrying out the inventive process.
FIG. 2 is a graph showing the voltage obtained from the apparatus of FIG. 1 plotted against time.
FIG. 3 is a schematic view of a preferred form of the inventive apparatus.

In accordance with the present invention, there is provided a process and apparatus for converting heat energy to electrical energy by disposing a cathode and an anode in a gas having an ionization potential greater than the thermionic work function of the cathode, the cathode having a thermionic work function greater than the thermionic work function of the anode and being connected to the anode by electrically conductive means; and increasing the temperature of the cathode and the pressure of the gas until the concentration of gas ions is sufficiently high to substantially neutralize the space charge surrounding the cathode, the anode being continuously maintained at a temperature below the temperature of the cathode.

The process and apparatus of the present invention eliminate the need for a gas which has an ionization potential less than the thermionic work function of the cathode. Also, the relatively high pressure of the gas surrounding the electrode inhibits the evaporation of cathode material, thus substantially extending the life of the apparatus.

The only requirement on the cathode temperature and gas pressure is that they produce a concentration of gas ions sufficiently high to substantially neutralize the space charge surrounding the cathode. As the gas pressure is increased, the mean free path of the gas atoms is decreased, and gas atoms bouncing off the hot cathode make numerous collisions with other gas atoms. In the preferred embodiment of the inventive process, the pressure of the gas is increased until the mean free path through the gas is less than the distance between the cathode and anode. Thermodynamically, the hot gas atoms have a finite probability of being ionized, given by the equation:

$$f^2p = 19.7 \times 10^{-7} T^{5/2} \exp\left(-1.16 \times 10^4 \frac{V_i}{T}\right)$$

wherein $f$ is the fractional number of atoms ionized, $p$ is the pressure of the gas, T is the temperature of the gas, and $V_i$ is the ionization potential of the gas. As can be seen from the equation, as the pressure of the gas is increased, the fractional number of atoms ionized decreases. However, since the total number of gas atoms per cubic centimeter increases, the total number of gas ions per cubic centimeter also increases (as the square root of the pressure). Thus, even if a very small fraction of gas atoms are ionized, the number of ions per cubic centimeter is high because of the high concentration of atoms at the increased pressure. For example, when a tungsten cathode at a temperature of 3000° K. is disposed in xenon gas at a pressure of 100 mm. of mercury, the ion concentration around the hot cathode has been calculated to be as high as $2 \times 10^{10}$ ions per cubic centimeter. When the ion concentration has been increased sufficiently to substantially neutralize the space charge surrounding the cathode, thermionic emission from the cathode proceeds uninhibited.

In addition to the gas ions, there may be ions of cathode material in the vicinity of the electrodes due to collisions between evaporated cathode material and gas molecules. However, as mentioned above, the amount of cathode material evaporated decreases as the gas pressure increases, thus extending the life of the apparatus.

The gas employed in the inventive process and apparatus is preferably argon, krypton, xenon, or any mixture of these gases with or without other rare gases. In order to ionize such gases, the operating temperature of the cathode must be at least 2400° K. However, other gases, such as sodium or barium, may also be employed. As mentioned above, the gas to be ionized has an ionization potential greater than the thermionic work function of the cathode.

The cathode employed in the novel process and apparatus may be tantalum, tungsten, tantalum carbide, or any other suitable electron-emitting material with a thermionic work function less than the ionization potential of the particular gas employed. In order to obtain an output voltage from the novel converter, the cathode must have a thermionic work function greater than the thermionic work function of the anode and must be connected to the anode by an electrically conductive means. The anode must also be continuously maintained at a temperature below the temperature of the cathode. Suitable anode materials are tungsten, tantalum, and thoriated tungsten. Although the spacing between the cathode and anode is not usually critical, the efficiency of the inventive process may be varied to some degree by varying the spacing.

The inventive process and apparatus will now be described in greater detail by referring to the drawings.

A simplified schematic view of an experimental thermoelectric converter employing the novel process is shown in FIG. 1 for the purpose of explaining the basic operating principles of the process. A heat source 10, such as an arc image furnace having a power output of 15 watts per square millimeter, is focused on a first tungsten sheet electrode 12. When argon, krypton, or xenon, or any mixture thereof, is the gas to be ionized, the heat source 10 must be capable of increasing the temperature of the first electrode 12 to at least 2400° K. A second tungsten sheet electrode 14 serves as the anode of the system, i.e., it collects the current from the hot electrode 12. The two electrodes 12 and 14 are enclosed in a sealed quartz envelope 16 which is initially evacuated through vacuum valve 18 by a high vacuum pump 20. The electrodes are externally connected by conductor 22, resistor 26, and conductor 24.

Under the initial vacuum conditions, thermionic emission from the hot cathode 12 produces an electrical current between the two electrodes, but because of the inhibiting space charge which accumulates around the cathode 12, this current is relatively small. In order to neutralize the space charge, valve 30 is opened and rare gas from bottle 32 fills the envelope 16 at a pressure of at least one mm. of mercury. As the rare gas passes over the cathode 12, the gas is at least partially ionized and thereby neutralizes the space charge in the vicinity of the cathode 12, thus permitting the cathode to emit more copiously than under vacuum conditions.

FIG. 2 shows relative voltage values as measured across resistor 26 before and after the rare gas is admitted to the envelope 16 from bottle 32. The abscissa in FIG. 2 represents time, and the ordinate represents voltages measured across resistor 26 by voltmeter 28. From time 0 to $t_0$, the cathode 12 is maintained at a temperature of at least 2400° K., but both the cathode and anode are under vacuum conditions. At time $t_0$, the vacuum valve 18 is closed and valve 30 is opened to allow xenon from bottle 32 to fill the envelope 16 at a pressure of about 100 mm. of mercury. As shown by the curve in FIG. 2, the voltage rises rapidly as the xenon is ionized and neutralizes the space charge around the cathode. The voltage soon levels off at a value $V_1$, which represents an increase of one or two orders of magnitude over $V_0$. The voltage remains almost constant at $V_1$ until time $t_1$, when the envelope 16 is again evacuated and the voltage drops rapidly to its original value $V_0$.

A schematic view of a preferred embodiment of the inventive apparatus for carrying out the novel process in a thermoelectric converter is shown in FIG. 3. The cathode 40 of this apparatus is in the form of an inverted "tungsten cup." The anode 44 is in the form of a larger inverted tantalum cup disposed around the cathode 40. The cathode 40 is brazed onto an annular copper base 42 which is continuously cooled by water passing through the annular cavity 43. Since the copper base 42 is electrically conductive, the external lead 46 for the cathode is affixed directly to the outer surface of the copper base. The external lead 48 for the anode is connected directly to the inverted tantalum cup.

In order to contain the gas around cathode 40 and anode 44 under pressure, an upper metallic sleeve 50 is brazed to the copper base, and an upper glass envelope 54 is secured to the sleeve 50 so as to form a completely closed space 64. Since the cathode is tungsten, the space 64 may be filled with any gas having an ionization potential greater than the thermionic work function of tungsten.

The heat source for the cathode 40 is a tungsten filament 47 disposed within the inverted tungsten cup. The filament 47 is heated by an electrical current passed through conductors 58 and 60. The only requirement on the electrically heated filament is that it be sufficient to heat the cathode 40 to the temperature required to ionize the particular gas employed. In order to form a vacuum between the filament 47 and the cathode 40, a lower metallic sleeve 52, with a glass envelope 56 secured thereto, is brazed to the copper base 42 so as to form a closed space 62 which can be evacuated.

In an example of the inventive process as utilized in the thermoelectric converter of FIG. 3, space 64 was filled with argon at a pressure of about 10 mm. of mercury. The cathode, a 0.5-inch diameter tungsten cup, was heated to a temperature of about 3000° K. The short circuit current between leads 46 and 48 was measured as 1.10 amp. Space 64 was then evacuated by pumping out the argon. With the cathode temperature still at about 3000° K., the short circuit current was measured as 0.04 amp.

While various specific forms of the present invention have been illustrated and described herein, it is not intended to limit this invention to any of the details herein shown, but only as set forth in the appended claims.

What is claimed is:

1. A process for thermoelectric conversion comprising disposing a cathode and an anode in a rare gas having an ionization potential greater than the thermionic work function of said cathode, said cathode having a thermionic work function greater than the thermionic work function of said anode, said cathode being connected to said anode by electrically conductive means; and increasing the temperature of said cathode and the pressure of said gas until the concentration of gas ions is sufficiently high to substantially neutralize the space charge surrounding said cathode, said anode being continuously maintained at a temperature below the temperature of said cathode.

2. A process for thermoelectric conversion comprising disposing a cathode and an anode in at least one gas selected from the group consisting of argon, krypton, and xenon, said cathode having a thermionic work function less than the ionization potential of said gas and greater than the thermionic work function of said anode, said cathode being connected to said anode by electrically conductive means; and increasing the temperature of said cathode and the pressure of said gas until the concentration of gas ions is sufficiently high to substantially neutralize the space charge surrounding said cathode, said anode being continuously maintained at a temperature below the temperature of said cathode.

3. A process for thermoelectric conversion comprising disposing a cathode and an anode in a rare gas having an ionization potential greater than the thermionic work function of said cathode, said cathode having a thermionic work function greater than the thermionic work function of said anode, said cathode being connected to said anode by electrically conductive means; increasing the temperature of said cathode sufficiently to effect thermionic emission from said cathode; and increasing the temperature of said cathode and the pressure of said gas until the concentration of gas ions is sufficiently high to substantially neutralize the space charge surrounding said cathode, said anode being continuously maintained at a temperature below the temperature of said cathode.

4. A process for thermoelectric conversion comprising disposing a cathode and an anode in at least one gas selected from the group consisting of argon, krypton, and xenon, said cathode having a thermionic work function less than the ionization potential of said gas and greater than the thermionic work function of said anode, said cathode being connected to said anode by electrically conductive means; increasing the temperature of said cathode sufficiently high to effect thermionic emission from said cathode; and increasing the pressure of said gas until the mean free path in said gas is less than the distance between said cathode and anode, said anode being continuously maintained at a temperature below the temperature of said cathode.

5. Apparatus for thermoelectric conversion comprising a cathode and an anode disposed in a rare gas having an ionization potential greater than the thermionic work function of said cathode, said cathode having a thermionic work function greater than the thermionic work function of said anode, said cathode being connected to said anode by electrically conductive means; means for increasing the temperature of said cathode and the pressure of said gas until the concentration of gas ions is sufficiently high to substantially neutralize the space charge surrounding said cathode; and means for continuoulsy maintaining said anode at a temperature below the temperature of said cathode.

6. Apparatus for thermoelectric conversion comprising a cathode and an anode disposed in at least one gas selected from the group consisting of argon, krypton and xenon, said cathode having a thermionic work function less than the ionization potential of said gas and greater than the thermionic work function of said anode, said cathode being connected to said anode by electrically conductive means; means for increasing the temperature of said cathode sufficiently high to effect thermionic emission from said cathode; and means for increasing the temperature of said cathode and the pressure of said gas until the concentration of gas ions is sufficiently high to substantially neutralize the space charge surrounding said cathode; and means for continuously maintaining said anode at a temperature below the temperature of said cathode.

References Cited by the Examiner

UNITED STATES PATENTS 2,980,819 4/61 Feaster ---------------- 310—4

FOREIGN PATENTS 797,872 7/58 Great Britain.

OTHER REFERENCES

Publication: Evaporation of Tungsten Under Various Pressures of Argon; Physical Review, Volume 31, February 1928, page 263.

Publication: Thermionic Diodes as Energy Converters, by Moss; Journal of Electronics, January 1957, pages 316 to 319.

Publication: Thermionic Energy Converter, by Hernqvist, Kanefsky and Norman: R.C.A. Review, volume 19, No. 2, pages 255 to 257, June 1958.

Journal of Applied Physics, April 1959, pages 475 to 480, inclusive.

MILTON O. HIRSHFIELD, *Primary Examiner.*

DAVID X. SLINEY, *Examiner.*